(12) United States Patent
Dubost (10) Patent No.: US 9,684,687 B1
(45) Date of Patent: Jun. 20, 2017

(54) MULTI-PHASE DATA EXPIRATION PATH FOR A DATABASE

(71) Applicant: CA, Inc., Islandia, NY (US)

(72) Inventor: Philippe Dubost, Prague (CZ)

(73) Assignee: CA, Inc., New York, NY (US)

(*) Notice: Subject to any disclaimer, the term of this patent is extended or adjusted under 35 U.S.C. 154(b) by 432 days.

(21) Appl. No.: 14/203,231

(22) Filed: Mar. 10, 2014

(51) Int. Cl.
*G06F 17/30* (2006.01)

(52) U.S. Cl.
CPC .. *G06F 17/30371* (2013.01); *G06F 17/30339* (2013.01)

(58) Field of Classification Search
USPC .......................... 707/609, 687, 705, 790, 813
See application file for complete search history.

(56) References Cited

U.S. PATENT DOCUMENTS

| 2010/0238801 A1* | 9/2010 | Smith | H04L 45/00 370/229 |
| 2014/0201737 A1* | 7/2014 | Mitkar | G06F 9/461 718/1 |

* cited by examiner

*Primary Examiner* — Sana Al Hashemi
(74) *Attorney, Agent, or Firm* — Coats & Bennett, PLLC

(57) ABSTRACT

Each row of data in a first database table is associated with a plurality of time thresholds that indicate, respectively, when a given row of data in the first table is current, stale, or expired. When a given row of data expires, that row is moved from the first table to a second database table that stores expired data. One of the time thresholds indicates a predetermined amount of time that the expired data will be maintained in the second table. Once that threshold expires, that row of data is deleted from the second table. Until then, however, a user may issue queries to access the expired data along with the current data and the stale data.

20 Claims, 6 Drawing Sheets

MULTI-PHASE DATA EXPIRATION PATH FOR A DATABASE

BACKGROUND

The present disclosure relates to computer-implemented databases, and more particularly to computer-implemented databases configured to manage the expiration of data in multiple phases.

The term "big data" is commonly associated with a set of data that is very large and very complex. In many cases, big data is so large and complex that it becomes difficult to manage with conventional tools and processing techniques. Typically, a size of a big data set may reach into the terabyte range or higher.

There are many different entities that rely on such big data for their day-to-day operations. For example, the users of social media sites, such as Facebook and Twitter, generally provide millions of status updates and tweets each day. To maintain the users, these sites must be able to handle these updates and the huge volume of data associated with them. Government agencies, as well as companies in the private sector, also maintain and rely on large complex sets of data for their everyday operations. However, regardless of the specific entity associated with big data, or their use of such large data sets, the orderly management, analysis, and processing of the data is an important task.

BRIEF SUMMARY

The present disclosure provides a computer-implemented method, an apparatus, and a computer-readable medium for managing, analyzing, and processing data. Particularly, embodiments of the present disclosure allow users to define a multi-phase expiration path for data stored in a database table, and modify a database manager application executing on a server to transition the data through the different phases of the multi-phase expiration path. With such transitioning, users are able to better identify a state of the data as being current, stale, or expired. Further, the sizes of the tables storing the data are reduced thereby improving performance and efficiency.

In one embodiment, the present disclosure provides a computer-implemented method. The method calls for maintaining first and second database tables in a memory of a computing device, wherein the first database table defines a multi-phase expiration path for data stored in the first database table. The method also calls for transitioning the data stored in the first database table along the multi-phase expiration path from an initial phase in which the data is current to a final phase in which the data is expired. The data in the final phase is moved from the first database table to the second database table where it is stored for a predetermined period of time. The current data from the first database table and the expired data from the second database table may be retrieved responsive to receiving a query from the user.

In another embodiment, the present disclosure provides a computing device, such as a database server, for example, comprising a communications interface circuit, a memory circuit, and a processing circuit communicatively connected to both the communications interface circuit and the memory circuit. The communications interface circuit is configured to communicate data with a client device via a communications network, such as the Internet, for example. The memory circuit is configured to store the data in a first database table that defines a multi-phase expiration path for the data stored in the first database table. The processing circuit is configured to transition the data stored in the first database table along the multi-phase expiration path from an initial phase in which the data is current to a final phase in which the data is expired, move expired data from the first database table to a second database table in the memory circuit to be stored for a predetermined period of time, and retrieve current data from the first database table and expired data from the second database table responsive to receiving a query from the user over the communications interface circuit.

Additionally, the present disclosure also provides a computer program product comprising a computer-readable medium. The computer-readable medium is configured to store a control application that, when executed by a processing circuit on a computing device, configures the processing circuit to maintain first and second database tables in a memory circuit of the computing device. The first database table defines a multi-phase expiration path for data stored in the first database table. The control application also configures the processing circuit to transition the data stored in the first database table along the multi-phase expiration path from an initial phase in which the data is current to a final phase in which the data is expired, move expired data from the first database table to the second database table to be stored for a predetermined period of time, and retrieve current data from the first database table and expired data from the second database table responsive to receiving a query from the user.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system and computer-implemented method for managing, analyzing, and processing sets of data by moving the data through the plurality of predefined phases that comprise a data expiration path. Particularly, when data is initially stored or updated in a database table, that data is considered "current." That is, the data is "fresh" or timely, and is considered meaningful and valid for consumption by a user. After some time, while the data may still be meaningful to a user, it is old. In this phase, the data is considered "stale". Finally, after some additional amount of time, such old or stale data is no longer considered meaningful and valid for consumption by a user, and as such, is considered "expired".

With the present disclosure, expired data is removed from the database table and stored for some predetermined amount of time in another auxiliary table. While in the auxiliary table, a user may access and retrieve expired data using a specially constructed query understood by the database management software executing at the database server.

By transitioning the data along the multi-phase data expiration path, embodiments of the present disclosure allow a user to properly identify which data is current data, which data is stale data, and which data is expired data. Moreover, embodiments of the present disclosure automatically "prune" the database tables of possibly unneeded data. This keeps the table size small and efficient thereby improving performance and saving table and/or disk space.

Figure 1:
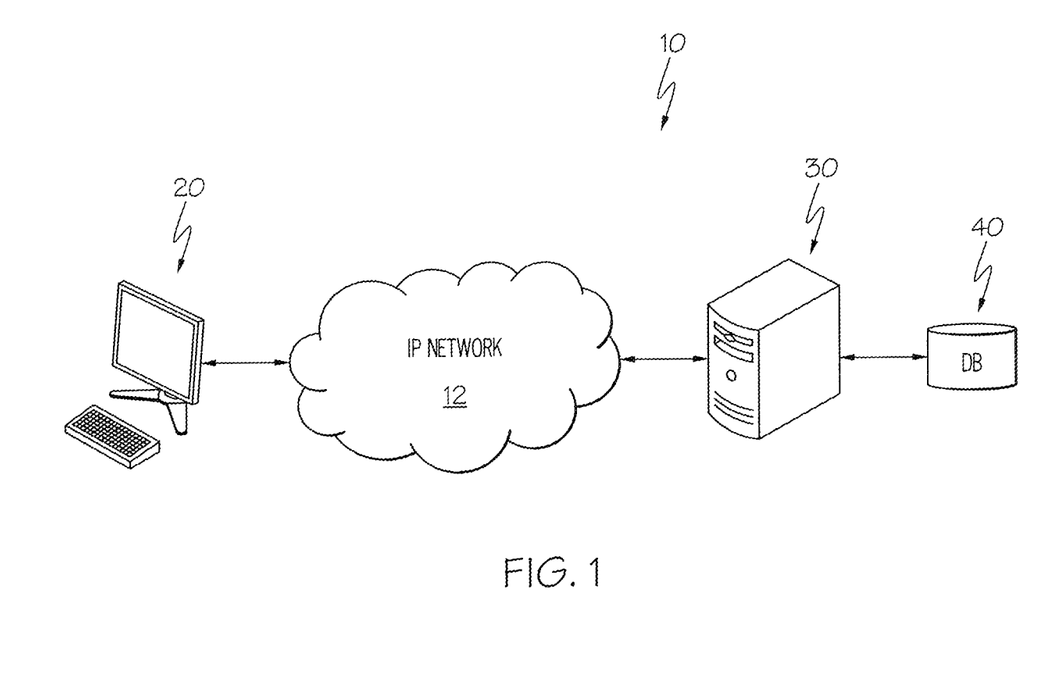
FIG. 1 is a block diagram illustrating a communications network configured according to one embodiment of the present disclosure.

Turning now to the drawings, FIG. 1 is a block diagram illustrating a communications system 10 configured to operate according to one embodiment of the present disclosure. As seen in FIG. 1, system 10 comprises an IP network 12 that communicatively interconnects a client device 20, such as a personal computer, for example, to a database server 30 and corresponding database 40. The IP network 12 may be any type of network known in the art, but in one embodiment, comprises a packet data network configured to communicate data in well-formed packets between the client device 20 and the server 30. One such IP network may comprise, but is not limited to, the Internet.

Generally, the database 40 stores data and information desired by a user of the client device 20. The server 30 comprises a computing device that is configured to access the database 40 and retrieve information for the user in response to receiving a well-structured query from the client device 20. By way of example, the user query may comprise a well-known Structured Query Language (SQL) query received from the client device 20 requesting data that satisfies a predetermined set of criteria set forth in the SQL query. In response to the query, a database manager at server 30 is configured to access one or more tables in the database 30, extract whatever data meets the predefined criteria from those tables, and return that data to the client device 20 in a response message for the user. Upon receipt, the client device 20 could, among other things, display that data to the user.

With conventional systems, the data stored and managed by a database is considered to be either valid or not valid. Data considered "valid" remains stored in the tables of the database. In this "valid" state, a user can query and retrieve the data so long as the data meets the criteria specified in a query. Data that is considered "not valid", however, is typically not stored in the database, but rather, is permanently removed or deleted from the tables of the database. As such, users cannot generally access and retrieve data once it has expired and is considered not valid.

Users desire, and request, the most current, up-to-date data; however, users also wish to know the state of the data. Therefore, in one embodiment, the present disclosure provides a system and method for moving data stored in a database table along a multi-phase data expiration path. Each phase of the path covers a predetermined time period, which as described in more detail later, may be defined by the user. Further, the data at each phase has specified properties that may be made known to the user. Knowing these properties allows the user to fully understand whether a given piece of data is still current and valid, and if so, how current and valid that data really is. Additionally, a server 30 configured according to the present disclosure assists an entity responsible for the data in managing the data.

Figure 2:
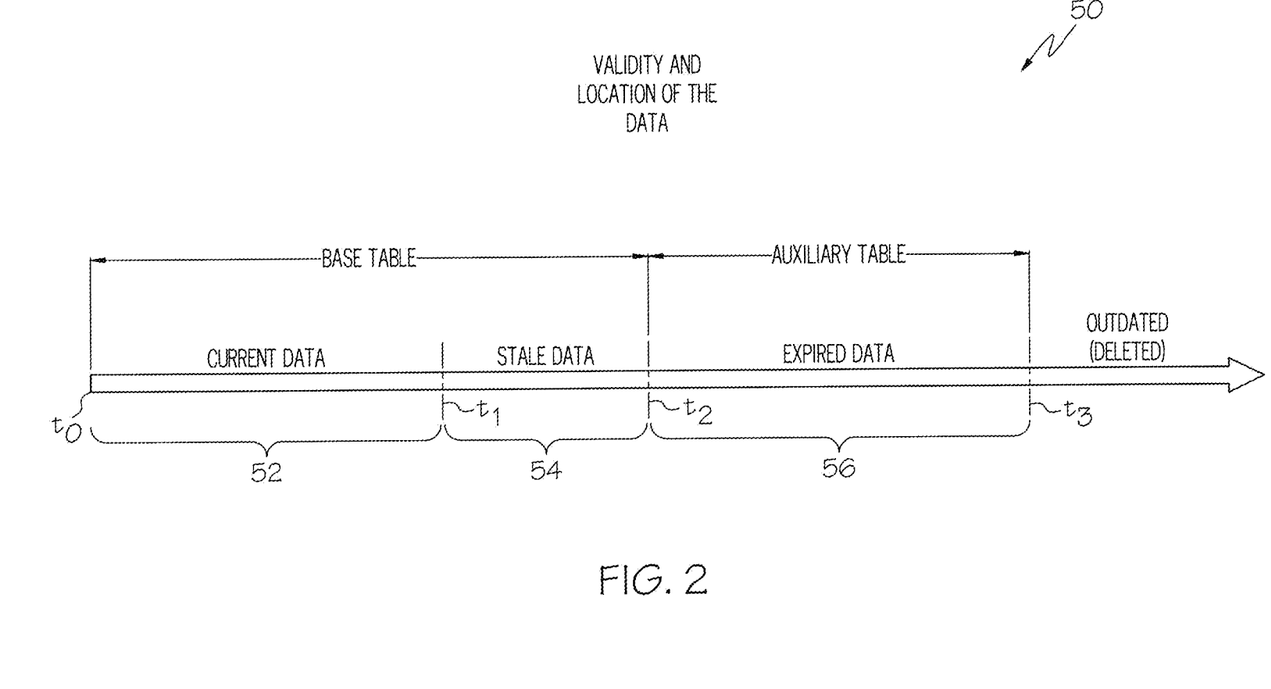
FIG. 2 is a diagram illustrating a timeline representing a multi-phase data expiration path according to one embodiment of the present disclosure.
Figure 3:
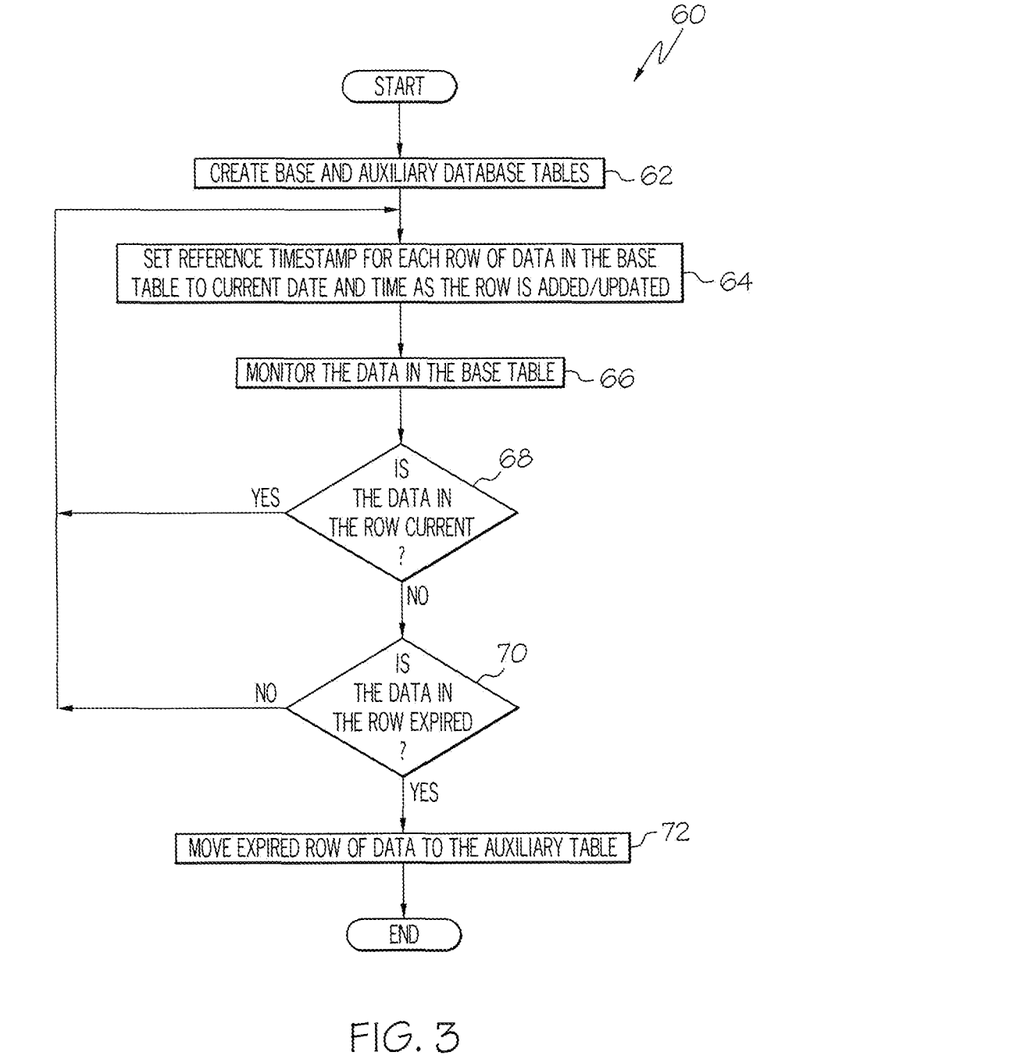
FIG. 3 is a flow diagram illustrating a method for transitioning the data stored in a database table along a multi-phase data expiration path according to one embodiment of the present disclosure.

FIG. 2 illustrates a multi-phase data expiration path 50 according to one embodiment of the present disclosure. As seen in FIG. 2, there are two tables—a base table and an auxiliary table. The structure and creation of both tables is described in more detail below; however, for now, it is sufficient to understand that the structures of the base and auxiliary tables are the same.

The multi-phase data expiration path 50 comprises a plurality of phases 52, 54, and 56, each phase covering a defined period of time that, as described in more detail later, are defined by the user creating the base and auxiliary tables using specialized keywords added to the database. The initial phase 52 covers the data from the time $t_0$ the data is initially added to (or updated in) the base table to a time $t_1$. During this time, the data of a given row in the base table is considered to be "current" and meaningful for consumption by the user. The second phase is an intermediate phase 54 covering the time specified by $t_1$ until the time $t_2$. While in the intermediate phase 54, the data of a given row in the base table is considered "stale". Such stale data may still be valid and meaningful to a user, but it is not as "fresh" or current as it was during the initial phase 52. Current data in either the initial phase 52, or stale data in the intermediate phase 54, are always accessible to the user in response to an SQL query sent from the client device 20.

The final phase 56 covers a time specified between time $t_2$ and $t_3$. During the final phase 56, the data of a given row is considered no longer valid or meaningful to the user, and thus, is "expired". Expired data, as stated above, is removed from the base table at time $t_2$, and stored instead in the auxiliary table until time $t_3$. The user, according to embodiments of the present disclosure, may still access and retrieve this expired data using a specialized keyword; however, after the time for the final phase 56 elapses, the given row of expired data in the auxiliary table is considered outdated and deleted from the auxiliary table.

Figure 4:
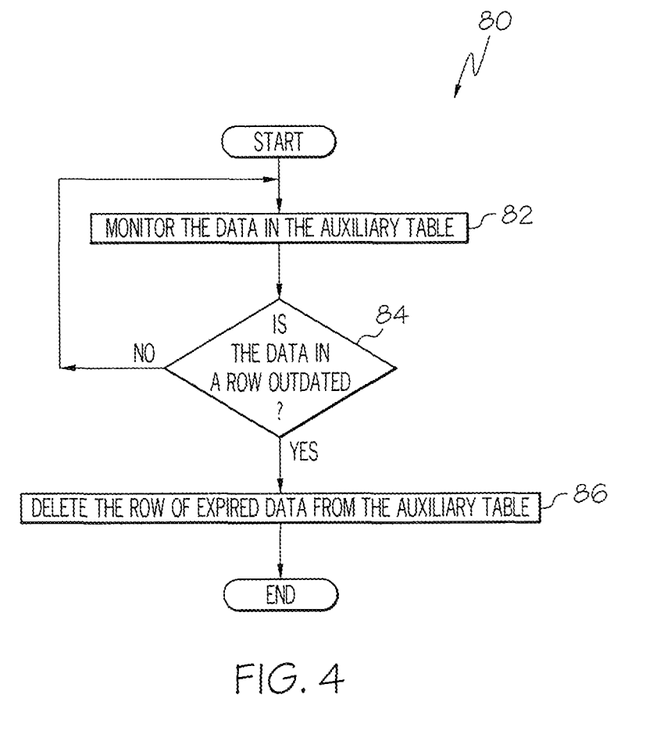
FIG. 4 is a flow diagram illustrating a method for transitioning the data stored in a database table along a multi-phase data expiration path according to another embodiment of the present disclosure.

FIG. 4 is a flow diagram illustrating a method 60, performed at server 30, for transitioning data along the multi-phase data expiration path 50 according to one embodiment. As seen previously in FIG. 1, server 30 is communicatively connected to both the client device 20 and the database 40, and retrieves data from database 40 for the user responsive to receiving SQL queries from the client device 20.

Method 60 begins with the user creating the base and the auxiliary tables (box 62). As is known in the art, the user may create the tables using the well-known CREATE TABLE statement. Particularly, the user accesses a database manager executing on server 30 and enters the keywords CREATE TABLE followed by a name of the table and the names and properties of one or more columns or fields in the table. In one embodiment, however, the present disclosure extends the database manager at server 30 to recognize and act on some additional keyword constructs that are not currently recognized by conventional database systems. More specifically, embodiments of the present disclosure provide new keywords that allow the user creating the table to define the time thresholds $t_1$, $t_2$, and $t_3$, and as such, define the multi-phase data expiration path 50. For example, in one embodiment of the present disclosure, a user may employ a CREATE TABLE statement formatted according to the following example syntax to create the base table.

CREATE TABLE base_table
    Field_1
    . . .
    Field_n
    LAST_UPDATE_TIMESTAMP
    EXPIRING DATA
       CURRENT_BEFORE xxx
       EXPIRES_AFTER yyy
       KEEP_EXPIRED_DATA_FOR zzz
where:
- Field 1-Field n identify the columns and data definitions (e.g., integer, string, timestamp, etc.) of each row of data stored in the base table;
- LAST_UPDATE_TIMESTAMP is a hidden field that is automatically added to each row of data when the table is created, and is automatically populated by the database manager to carry a date/time value indicating when the data in the row was added or last updated. This field is also used as a reference timestamp when determining whether a given row of data is current, stale, expired, or outdated.
- EXPIRING_DATA is a new keyword identifying a section of the SQL statement that identifies the time thresholds for the multi-phase data expiration path;
- CURRENT_BEFORE is a new keyword that identifies the time threshold $t_1$ before which the data in a given row is current;

EXPIRES_AFTER is a new keyword that indicates the time threshold $t_2$ after which the data in a given row is expired and moved to the auxiliary table;

KEEP_EXPIRED_DATA_FOR is a new keyword that indicates a predetermined length of time in which expired data is maintained in the auxiliary table and is accessible to the user;

xxx, yyy, and zzz are time values expressed in seconds, minutes, days, months, quarters, years, or some other measurable amount of time.

In one embodiment, the user enters the time values for one or more of xxx, yyy, and zzz, with xxx>=yyy>=zzz. The database manager may be configured to enforce this constraint. The values may comprise date-time stamps, for example, indicating an express date and time that a given row of data transitions to the next phase, or they may comprise a numerical value defining a length of time (e.g., 12 days) that the given row of data remains in a given phase. In another embodiment, the user provides the value for the CURRENT_BEFORE keyword, or the value is initially set by the database manager. Then, based on the value, the database manager at server 30 automatically computes the other values for one or both of the EXPIRES_AFTER and KEEP_EXPIRED_DATA_FOR keywords. Such computations may be performed, for example, considering a minimum time or other default time period/date predefined at the database manager.

In any case, the database manager is configured to ensure that the values for these keywords remain within a valid range. Further, a user with the appropriate permissions can alter one or all of the time values associated with these keywords during or after creating the table.

In addition to creating the base table, the database manager at server 30 is configured to also create the auxiliary table. In one embodiment, the auxiliary table is created in the background by the database manager to comprise the same structure as the base table, and to comprise the same value for the KEEP_EXPIRED_DATA_FOR keyword. As stated previously, data removed from the base table is stored as a row in the auxiliary table for the amount of time specified by the KEEP_EXPIRED_DATA_FOR keyword. Until this time is reached, the data is reachable by the user via a specialized SQL statement. After this time is reached, however, the row of data is deleted from the auxiliary table.

Once the tables are created, the user, or an application associated with the user, for example, may store data as rows in the base table. Additionally, the user or an application may update a given row of data in the base table. When this occurs, the database manager populates or sets the LAST_UPDATE_TIMESTAMP value with a current timestamp value (box 64). The database manager then monitors the data in the table using the LAST_UPDATE_TIMESTAMP value for each row in a computation to determine whether a given row should be moved along the multi-phase data expiration path (box 66).

Particularly, in one embodiment, the database manager adds a current timestamp value ($t_C$) to the value in the LAST_UPDATE_TIMESTAMP field, and compares the computed value to the timestamp value indicated by the CURRENT_BEFORE keyword (box 68).

$$S=t_C+\text{LAST\_UPDATE\_TIMESTAMP}<=\text{CURRENT\_BEFORE}$$

If the computed value S does not exceed the CURRENT_BEFORE value, the data in the row is considered current (i.e., still in its initial phase 52) and the method continues with the subsequent update (box 64) and monitoring (box 66) of the data.

If, however, the computed value S exceeds the CURRENT_BEFORE value, the database manager will check to determine whether the data in the given row is expired (box 70). This may be accomplished, for example, by comparing the computed timestamp value S to the timestamp value in the EXPIRES_AFTER keyword.

$$S=t_C+\text{LAST\_UPDATE\_TIMESTAMP}<=\text{EXPIRES\_AFTER}$$

If the computed timestamp value S does not exceed the EXPIRES_AFTER value, the database manager considers the data in the given row to be stale. The stale data will remain in the base table, but as described in more detail below, will be indicated as being "stale" to the user upon being retrieved from the base table. If the computed timestamp value S exceeds the EXPIRES_AFTER value, however, the database manager considers the data in the given row to be expired. In these cases, the database manager deletes the row of data from the base table, and moves the row of data to the auxiliary table (box 72).

In these embodiments, the LAST_UPDATE_TIMESTAMP value is utilized as a reference timestamp. However, the LAST_UPDATE_TIMESTAMP value may also be altered at any desired time by a user with the appropriate permissions. For example, the user may update the LAST_UPDATE_TIMESTAMP value to equal a current date and time, thereby "refreshing" the data in a given row such that the data remains current, or returns to the initial phase 52 such that it is considered current once again. In another example, the user may consider a particular row of data to be expired before its time, and thus, force the LAST_UPDATE_TIMESTAMP value to exceed the EXPIRES_AFTER value. In yet another embodiment, the user may change the LAST_UPDATE_TIMESTAMP value to a date far into the past to ensure that the data in the given row remains current for a long time.

FIG. 4 is a flow diagram illustrating a method 80 in which the database manager manages the expired data stored in the auxiliary table according to one embodiment. Method 80 begins with the database manager monitoring the LAST_UPDATE_TIMESTAMP value for each row of expired data in the auxiliary table (box 82). This monitoring continues so long as a computed timestamp value S, which equals the current timestamp value $t_C$ added to the LAST_UPDATE_TIMESTAMP value for a given row of expired data, does not exceed the value set for the KEEP_EXPIRED_DATA_FOR keyword (box 84). However, when the database manager discovers that the calculated timestamp value S for a given row of expired data exceeds the KEEP_EXPIRED_DATA_FOR value (box 84), the database manager deletes the given row of expired data from the auxiliary table.

As stated previously, the current and stale data stored in the base table are readily accessible to the user of client device 20. However, unlike conventional database systems, the expired data stored in the auxiliary table is also readily accessible to the user of client device 20 for the period of time specified by KEEP_EXPIRED_DATA_FOR. More particularly, the users of client device 20 needs only to issue an SQL SELECT statement specially modified according to the present disclosure, to access and retrieve any data in the base table and in the auxiliary table that satisfies the particular criteria indicated in the SQL statement. In one embodiment, for example, an SQL SELECT statement modified according to the present disclosure may comprise the following syntax.

SELECT Field 1 . . . Field n
        FROM base_table
        WHERE <criteria>
        . . .
    INCLUDE_EXPIRED_DATA
    ;

In this embodiment, the SQL SELECT statement issued by the user comprises a newly defined keyword INCLUDE_EXPIRED_DATA. This keyword, which does not exist in conventional database systems, causes the database manager at server 30 to access both the base table and the auxiliary table to retrieve any rows of current, stale, and expired data that meet the criteria indicated in the WHERE clause.

Figure 5:
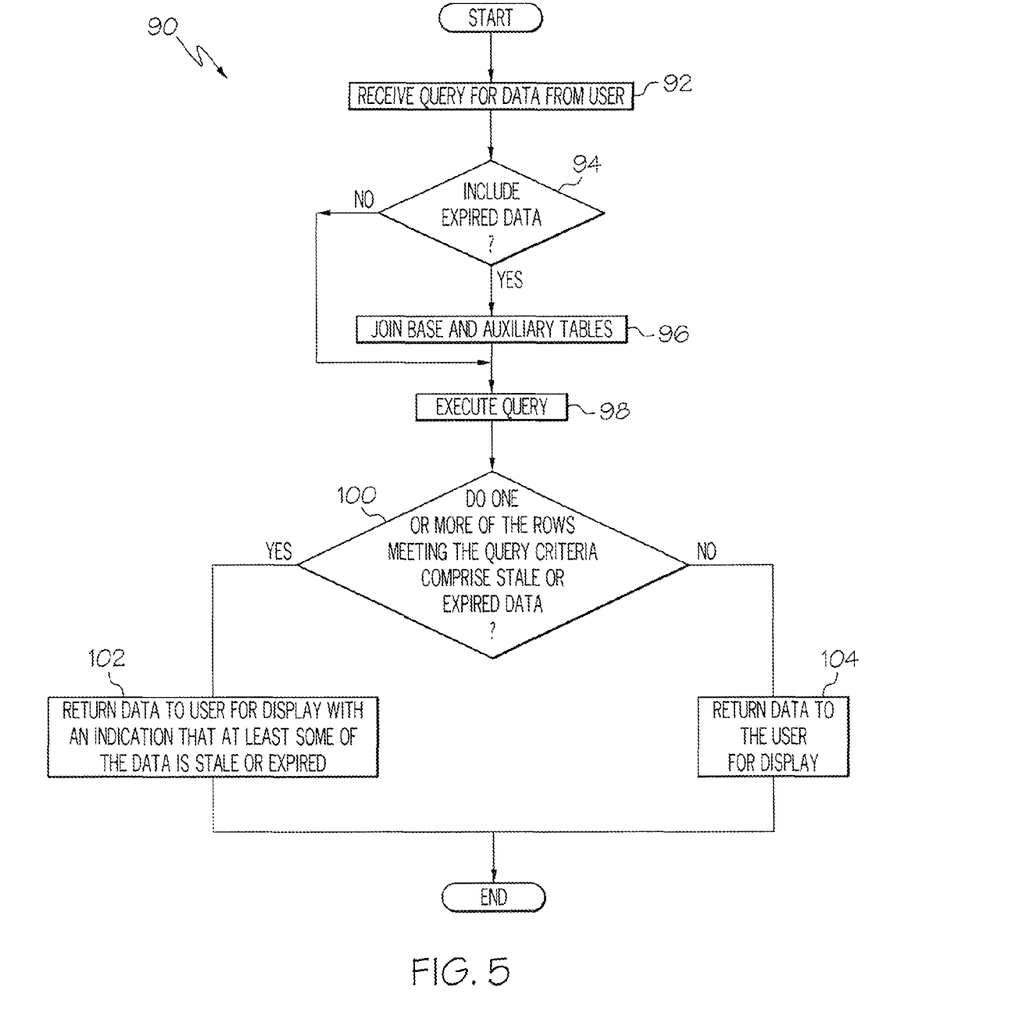
FIG. 5 is a flow diagram illustrating a method for responding to a user query for data according to one embodiment of the present disclosure.

FIG. 5 is a flow diagram illustrating a method 90 in which the database manager retrieves rows of current and stale data from the base table, as well as rows of expired data from the auxiliary table, in response to receiving an SQL SELECT statement comprising the syntax described above.

Method 90 begins with the database manager receiving the SQL SELECT query from the user (box 92). Upon receipt, the database manager parses the SQL SELECT statement to determine whether it specifies the INCLUDE_EXPIRED_DATA directive (box 94). If not, the database manager simply executes the SQL SELECT statement on the base table (box 98). However, if the INCLUDE_EXPIRED_DATA directive is included in the SQL SELECT statement received from the user, the database manager prepares the base and the auxiliary tables for access. Particularly, in one embodiment, the database manager executes an SQL JOIN function to join the base table and the auxiliary table (box 96). The database manager then executes the query on the joined table (box 98).

Regardless of whether the user indicated to consider expired data, however, the database manager will analyze the result set to determine whether any of the returned rows of data include stale or expired data (box 100). If so, the database manager sets a flag in a return message to the client device 20, for example, to indicate to the user that the results contain stale and/or expired data (box 102). The flag lets the user know, when the data is displayed, for example, that some or all of the data may not be current. Otherwise, the database manager simply sends the result set, which contains only current data, to the client device 20 for display to the user (box 104).

Figure 6:
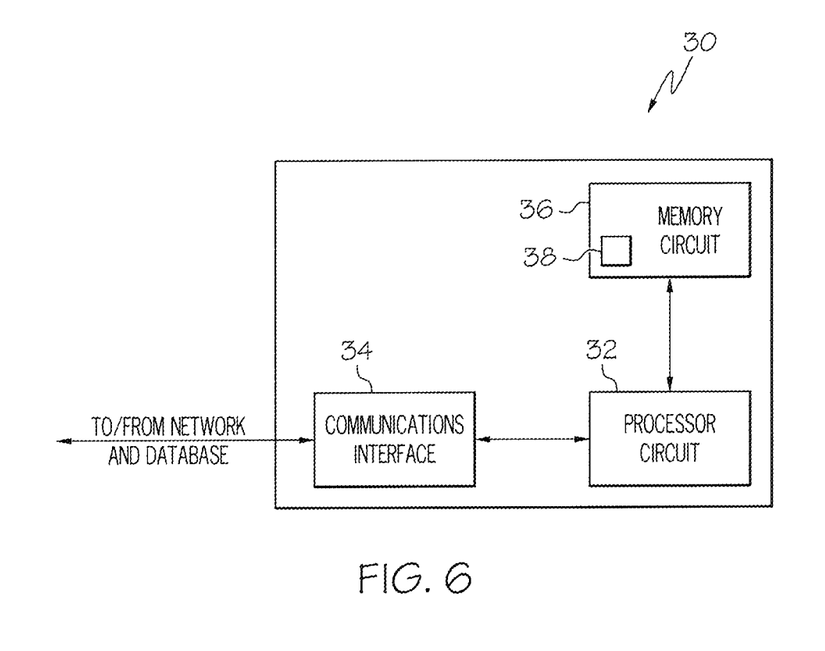
FIG. 6 is a block diagram illustrating some functional components of a database server configured to operate according to one embodiment of the present disclosure.

FIG. 6 is a block diagram illustrating some functional components of a server 30 configured according to one embodiment. Server 30 comprises, as previously stated, a computing device that communicates data and information with the client device 20 via IP network 12. While FIG. 6 illustrates some components, those of ordinary skill in the art will readily appreciate that server 30 may or may not comprise additional functional components not expressly seen in the figures.

As seen in FIG. 6, the server 30 comprises a processor circuit 32, a communications interface 34, and a memory circuit 36 that stores a control application 38. The processor circuit 32 may be implemented by one or more microprocessors, hardware, firmware, or a combination thereof, and generally controls the operation and functions of server 30 according to logic and instructions stored in the memory circuit 36. Such operations and functions include, but are not limited to, communicating with client device 20 and with database 40 to request and retrieve data for a user of client device 20 as previously described. Additionally, the processor circuit 32 also executes the control application 38, which comprises, for example, the previously described database manager, and implements its functions to define the multi-phase data expiration path 50, transition data stored in tables of the database along the multi-phase data expiration path, and to access any expired data in the database 40, as previously described.

The communications interface 34 may comprise any communication interface known in the art that enables server 30 to communicate data and information with the client device 20 via IP network 12, and with database 40. For example, the communications interface 34 in one embodiment comprises an interface card that operates according to any of standards that define the well-known Ethernet® protocol. However, other protocols and standards are also possible with the present disclosure.

The memory circuit 36 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 36 stores the control application 38 (e.g., the database manager), when executed by the processor circuit 32, controls server 30 to perform the functions previously described.

The present embodiments may, of course, be carried out in other ways than those specifically set forth herein without departing from essential characteristics of the disclosure. For example, the embodiments described above are shown with certain names or labels for the new keywords (e.g., "CURRENT_BEFORE", "EXPIRES_AFTER", "KEEP_EXPIRED_DATA_FOR", LAST_UPDATE_TIMESTAMP", "INCLUDE_EXPIRED_DATA", etc.). Those skilled in the art, however, will appreciate that these particular names are merely illustrative and that the keywords may be named using other labels as needed or desired.

Additionally, those of ordinary skill in the art should also appreciate that although the previous embodiments describe how to create a table in accordance with the present disclosure, it is also possible to modify the structure of an existing table according to the present disclosure. One way to accomplish this is through the use of the ALTER TABLE SQL statement formatted according to the following syntax.

ALTER TABLE base_table
        ADD LAST_UPDATE_TIMESTAMP
        ADD EXPIRING DATA
        ADD CURRENT_BEFORE xxx
        ADD EXPIRES_AFTER yyy
        ADD KEEP_EXPIRED_DATA_FOR zzz
    ;

In this embodiment, altering the existing table would also trigger the control application 38 (e.g., the database manager) to also create the auxiliary table, and enforce the rules that define valid ranges and values for each of these newly added fields, as described previously.

Similarly, those of ordinary skill in the art will realize that embodiments of the present disclosure also allow for removing these fields from the base table. For example, a user might issue an ALTER TABLE SQL statement with the following syntax.

ALTER TABLE base_table
        DROP EXPIRING DATA
    ;

Such an SQL command could trigger the control application 38 to drop the corresponding auxiliary table, and further, cease the afore-mentioned processing of each row of the base table. Additionally, this command may trigger the control application 38 to alter the structure of the base table by deleting the fields and data associated with the EXPIRING DATA tag from the base table.

It should also be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    creating first and second database tables in a memory of a computing device, wherein the first and second database tables define a multi-phase expiration path for data stored in the first and second database tables, and are created based on keywords that identify a plurality of time values defining respective predetermined time periods for each phase in the multi-phase expiration path;
    transitioning the data stored in the first database table along the multi-phase expiration path from an initial phase in which the data is current to a final phase in which the data is expired;
    moving expired data from the first database table to the second database table to be stored for a predetermined period of time; and
    retrieving current data from the first database table and expired data from the second database table responsive to receiving a query from a user.

2. The computer-implemented method of claim 1 wherein the multi-phase expiration path for the data stored in the first database table further comprises an intermediate phase in which the data in the first database table is stale but not expired.

3. The computer-implemented method of claim 2 wherein retrieving current data from the first database table and expired data from the second database table responsive to receiving a query from the user further comprises:
    retrieving stale data from the first database table in addition to the current data responsive to receiving the query from the user; and
    indicating, to the user, that some of the data retrieved from the first database table comprises stale data.

4. The computer-implemented method of claim 2 wherein transitioning the data stored in the first database table along the multi-phase expiration path from an initial phase in which the data is current to a final phase in which the data is expired comprises:
    transitioning the data stored in the first database table from the initial phase to the intermediate phase after a first predetermined time period has expired; and
    transitioning the data stored in the first database table from intermediate phase to the final phase after a second predetermined time period has expired, wherein the second predetermined time period is not less than the first predetermined time period.

5. The computer-implemented method of claim 2 wherein each row of data in the first database table comprises a reference timestamp indicating when the data in the row was added or updated, and wherein the respective predetermined time periods for each phase in the multi-expiration path comprises:
    a first time threshold defining a first predetermined time period during which a selected row comprises data that is current;
    a second time threshold defining the second predetermined time period during which the selected row comprises data that is stale; and
    a third time threshold defining a fixed time period for which the expired data remains in the second database table.

6. The computer-implemented method of claim 5 wherein transitioning the data stored in the first database table along the multi-phase expiration path from an initial phase in which the data is current to a final phase in which the data is expired comprises transitioning the selected row of data along the multi-phase expiration path based on a comparison of the reference timestamp of the selected row to the time thresholds.

7. The computer-implemented method of claim 5 further comprising calculating respective time values for the second and third time thresholds based on a time value for the first time threshold.

8. The computer-implemented method of claim 1 further comprising deleting a row of the expired data from the second database table if a reference timestamp associated with the row of expired data is greater than a current timestamp.

9. A computing device comprising:
- a communications interface circuit configured to communicate data with a client device via a communications network;
- a memory circuit configured to store the data in first and second database tables, wherein the first and second database tables are created to define a multi-phase expiration path for the data stored in the first and second database tables, and are created based on keywords that identify a plurality of time values defining respective predetermined time periods for each phase in the multi-phase expiration path; and
- a processing circuit communicatively connected to both the communications interface circuit and the memory circuit, and configured to:
  - transition the data stored in the first database table along the multi-phase expiration path from an initial phase in which the data is current to a final phase in which the data is expired;
  - move expired data from the first database table to a second database table in the memory circuit to be stored for a predetermined period of time; and
  - retrieve current data from the first database table and expired data from the second database table responsive to receiving a query from a user over the communications interface circuit.

10. The computing device method of claim 9 wherein the multi-phase expiration path for the data stored in the first database table further comprises an intermediate phase in which the data in the first database table is stale but not expired.

11. The computing device of claim 10 wherein to retrieve current data from the first database table and expired data from the second database table responsive to receiving a query from the user, the processor circuit is further configured to:
- retrieve stale data from the first database table in addition to the current data; and
- indicate, to the user, that some of the data retrieved from the first database table comprises stale data.

12. The computing device of claim 10 wherein to transition the data stored in the first database table along the multi-phase expiration path from an initial phase in which the data is current to a final phase in which the data is expired, the processor circuit is further configured to:
- transition the data stored in the first database table from the initial phase to the intermediate phase after a first predetermined time period has expired;
- transition the data stored in the first database table from intermediate phase to the final phase after a second predetermined time period has expired, wherein the second predetermined time period is not less than the first predetermined time period.

13. The computing device of claim 10 wherein each row of data in the first database table comprises a reference timestamp indicating when the data in the row was added or updated, and wherein the processing circuit is further configured to:
- maintain a first time threshold defining a first predetermined time period during which a given row comprises data that is current;
- maintain a second time threshold defining the second predetermined time period during which the given row comprises data that is stale; and
- maintain a third time threshold defining a fixed time period for which the expired data remains in the second database table.

14. The computing device of claim 13 wherein the processor circuit is further configured to transition the given row of data along the multi-phase expiration path based on a comparison of a current timestamp to each of the first, second, and third time thresholds.

15. The computing device of claim 9 wherein the processor circuit is further configured to delete a row of expired data from the second database table if a reference timestamp associated with the row of expired data is greater than a current timestamp.

16. A computer program product comprising a computer-readable medium configured to store a control application that, when executed by a processing circuit on a computing device, configures the processing circuit to:
- create first and second database tables in a memory circuit of a computing device, wherein the first and second database tables define a multi-phase expiration path for data stored in the first and second database tables, and are created based on keywords that identify a plurality of time values defining respective predetermined time periods for each phase in the multi-phase expiration path;
- transition the data stored in the first database table along the multi-phase expiration path from an initial phase in which the data is current to a final phase in which the data is expired;
- move expired data from the first database table to the second database table to be stored for a predetermined period of time; and
- retrieve current data from the first database table and expired data from the second database table responsive to receiving a query from a user.

17. The computer program product of claim 16 wherein the multi-phase expiration path for the data stored in the first database table further comprises an intermediate phase in which the data in the first database table is stale but not expired.

18. The computer program product of claim 17 wherein the control application is further configured to control the processing circuit to:
- retrieve stale data from the first database table in addition to the current data responsive to receiving the query from the user; and
- indicate, to the user, that some of the data retrieved from the first database table comprises stale data.

19. The computer program product of claim 17 wherein each predetermined time threshold defined by the first database table is associated with a different phase of the multi-phase expiration path, and wherein the control application is further configured to control the processing circuit to:
- transition a row of data stored in the first database table from the initial phase to the intermediate phase after a first predetermined time threshold has expired;
- transition the row of data stored in the first database table from intermediate phase to the final phase after a second predetermined time threshold has expired, wherein the second predetermined time threshold is not less than the first predetermined time threshold; and
- delete the row of data from the second database table after a third predetermined time threshold has expired.

20. The computer program product of claim 19 wherein the control application is further configured to control the processing circuit to calculate respective values for the second and third predetermined time thresholds based on a value of the first predetermined time threshold.

* * * * *